United States Patent
Robb

[19]

[11] Patent Number: 6,075,189

[45] Date of Patent: Jun. 13, 2000

[54] ARTIFICIAL FINGER TIP

[76] Inventor: Karl A. Robb, 2500 Q St., Apt. 504, Washington, D.C. 20007

[21] Appl. No.: 09/020,854

[22] Filed: Feb. 9, 1998

[51] Int. Cl.[7] .............................. G10D 3/00; G10D 3/16
[52] U.S. Cl. ............................................. 84/322; 84/315
[58] Field of Search .............................. 84/315, 320–322

[56] References Cited

U.S. PATENT DOCUMENTS

| | | | |
|---|---|---|---|
| 1,184,710 | 5/1916 | Baumann . | |
| 1,444,982 | 2/1923 | Orth . | |
| 3,297,595 | 1/1967 | Ferguson | 84/322 |
| 3,789,720 | 2/1974 | McIntyre | 84/322 |
| 5,323,677 | 6/1994 | Knutson | 84/322 |
| 5,453,759 | 9/1995 | Seebach | 345/158 |
| 5,559,301 | 9/1996 | Bryan, Jr. et al. | 84/653 |

*Primary Examiner*—Robert E. Nappi
*Assistant Examiner*—Marlon T. Fletcher

*Attorney, Agent, or Firm*—Roberts Abokhair & Mardula, LLC

[57] ABSTRACT

An operator or artificial finger tip for entering commands and data into a personal data device, such as an electronic notebook, by contacting the screen of the personal data device. The operator comprises a partially rigid base which encircles the finger, generally conforming to the finger, and a rigid tip member which projects forwardly from the base to contact the screen. The tip of the tip member is of reduced diameter at the point of contact with the screen. The tip member has a snap fitting connector enabling it to be manually and removably attached to the base. The base is tubular and has a plurality of sockets, and the tip member has an equivalent number of male elements snap fitting to the sockets. Preferably, a plurality of tip members are provided, each differing from the others in diameter such that a selection of tip sizes varying in relative fineness at the point of contact with the screen is available to the user.

8 Claims, 2 Drawing Sheets

ARTIFICIAL FINGER TIP

BACKGROUND OF THE INVENTION

1. Field of the Invention

The present invention relates to devices extending reach of a person's finger, such as picks for stringed instruments. More particularly, the invention provides a rigid extension which can be installed on a finger for purposes of operating touch controls on the screen of an automated data device. The device includes a portion for installing over a finger tip and a detachable rigid extension.

2. Description of the Prior Art

Personal data devices for storing and handling information have come into widespread use concurrently with computers, calculators, and other electronic data handling devices. In particular, some devices intended for assisting individuals as automated secretaries have been developed. An illustrative example is a device popularly known as an electronic notebook. An electronic notebook is a data processing device adapted to store information and to categorize or otherwise handle that information, and has a display screen and a microprocessor. Personal data devices may be programmed to enable the user to enter control commands determining how data is entered, stored, and manipulated.

Such devices receive control commands by touching a portion of the display screen bearing very small switches, or microswitches. A display portion of the screen displays images corresponding to screen positions associated with available command selections, and may show a screen position being contacted in order to enter a command. As personal data devices may be quite small and compact, it follows that the screens are also small. Successfully entering a command is dependent upon having a suitable utensil for contacting the screen in a limited area in a manner which will operate a selected microswitch, but will not operate other microswitches inadvertently. Typically, the personal data device is provided with an elongated stylus which is held in one hand in contact with the screen at a selected position to operate a microswitch to carry out a particular command or to enter data.

Although a conventional stylus can operate its personal data device, it is slightly unwieldy for its purpose. A smaller device which does not require grasping by the palm or by several fingers or both may actually expedite operation of the personal data device.

Devices worn upon a single finger and having forward projections for operating equipment are known in the prior art. Picks for stringed musical instruments offer examples. U.S. Pat. No. 1,444,982, issued to Harold Orth on Feb. 13, 1923, and U.S. Pat. No. 5,323,677, issued to John A. Knutson on Jun. 28, 1994, all illustrate picks for musical instruments. U.S. Pat. No. 1,184,710, issued to Charles Baumann on May 30, 1916, shows a guard to protect a user while slicing. These devices all have structure for encircling the finger, thereby mounting the subject device on the hand, and a rigid projection. While the encircling structure and projection are also features of the present invention, these prior art inventions lack removable and interchangeable projections, as seen in the present invention.

U.S. Pat. No. 5,453,759, issued to Jurgen Seebach on Sep. 26, 1995, illustrates a communications device worn on the finger. However, the device of Seebach is not intended to make contact with other objects. It lacks removable and interchangeable projections seen in the present invention.

None of the above inventions and patents, taken either singly or in combination, is seen to describe the instant invention as claimed.

SUMMARY OF THE INVENTION

The present invention provides a finger worn artificial finger tip, or screen operator, suitable for operating microswitches formed in touch screens of personal data devices. The screen operator envelops and is retained by a finger of the user. The user obstructs less of the visual field of the screen and more dexterously controls contact of the screen when employing the novel screen operator, thereby expediting entering of commands to the personal data device.

The screen operator comprises a flexible base for securement to the finger and a removable rigid projection for contacting the screen of the personal data device. The base may be manipulated into comfortable and effective engagement conforming to and cooperating with the finger. The projection snap fits or otherwise removably engages the base. Several points of connection of tip to base are provided, so that attachment is dependable and reliable, and also steady in that the geometric position of the tip relative to the base remain constant and predictable in use.

Preferably, a selection of projections are provided, each having a hard tip different in dimensions from the others. The different dimensions or sizes correspond to fine, intermediate, and coarse sized tips. Thus the user is afforded an opportunity to select among several sizes a tip which is convenient and effective for him or her. The decision is based upon ease of visual access to the screen, dimensions of the switching area of the screen, and other considerations which affect effectiveness of any particular selected tip.

Accordingly, it is one object of the invention to provide a screen operator worn on a finger for contacting the screen of a personal data device to effect commands and to enter data.

It is another object or the invention to provide a selection of tip sizes for the screen operator.

It is a further object of the invention to provide a flexible base which can be manipulated into comfortable and effective engagement with the finger.

Still another object of the invention is that the various tip sizes be readily and manually attachable to and detachable from the base.

An additional object of the invention is to provide several points of attachment of the tip to the base, thereby assuring steady and dependable attachment.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION OF THE PREFERRED EMBODIMENTS

Figure 1:
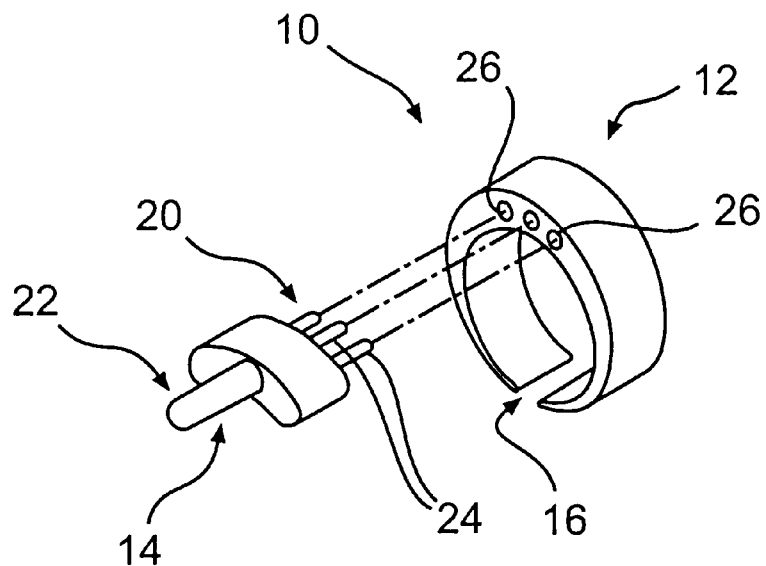
FIG. 1 is an exploded, perspective view of the invention.

Turning now to FIG. 1 of the drawings, screen operator 10 is seen to comprise a base 12 dimensioned and configured to engage the finger of a user (see FIG. 2), and a separate tip member 14 which is removably and manually attachable to base 12. Base 12 engages the finger by full or partial encirclement. Preferably, base 12 is generally tubular, other than having a gap shown at 16. As contrasted to a ring lacking overall length of a tube, tubular configuration promotes axial alignment of screen operator 10 with the finger of the user. The central longitudinal axis of base 12 is shown at 18 in FIG. 2. Axis 18 need not necessarily be coaxial with the finger of the user. This characteristic is very helpful in maintaining accuracy of screen operator 10 when in use.

Figure 2:
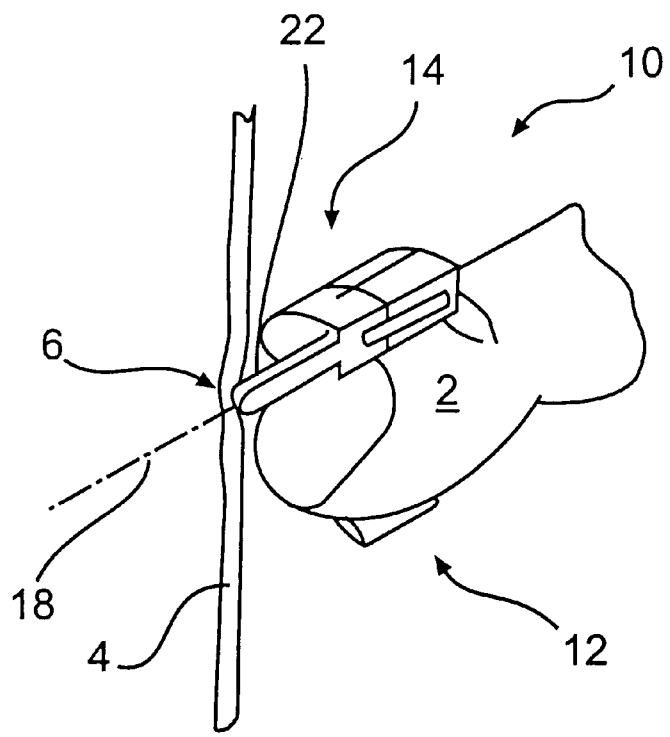
FIG. 2 is an exaggerated, environmental, side elevation view of the invention, drawn partly in cross section.

Base 12 is fabricated from a material or materials providing partial rigidity. That is, base 12 is sufficiently flexible to deform under manual pressure, yet sufficiently rigid to maintain its configuration after deformation in the absence of manual pressure. Gap 16 allows the circumference of base 12 to be adjusted for different fingers. After base 12 is placed over a finger (as shown in FIG. 2), it conforms to the finger and maintains its grip by rigidity. Any suitable material exhibiting the above characteristics will be adequate. It is, however, preferred that base 12 be somewhat flexible and resilient at least at its surface for comfort. One suitable construction would be a core of bendable metal (not shown) surrounded by flexible rubber-like material, such as soft or foamed synthetic resin (not shown).

Tip member 14 has a connector 20 and a relatively slender rigid projection 22. Connector 20 comprises three male members 24 of a snap fitting device which cooperate with an equal number of sockets 26 formed in base 12. Snap fitting devices are manually connectable and detachable, but have sufficient frictional mutual adherence to assure that tip member 14 will not spontaneously lose operable engagement of base 12. Male members 24 and sockets 26 are arranged parallel to axis 18 so that when tip member 14 is fitted to base 12, projection 22 projects forwardly in a direction parallel to axis 18. It is preferred that plural male members 24 and sockets 26 be provided, so that plural points of connection are present between base 12 and tip member 14. This arrangement assures firstly, that should one male member 24 break off, screen operator 10 will still be operable, and secondly, that tip member 14 be predictably and reliably maintained in its forwardly projecting orientation relative to base 12.

FIG. 2 shows screen operator 10 in use. Screen operator 10 is slipped over finger 2 of a user, and may then be placed in contact with screen 4 of a personal data device (not shown in its entirety). Contact at 6 compresses screen 4, thereby causing microswitches (not separately shown) to close and complete electrical circuits for entering data and carrying out commands. Screen operator 10 may be placed as desired on finger 2, within limits imposed by length of projection 22.

Figure 3:
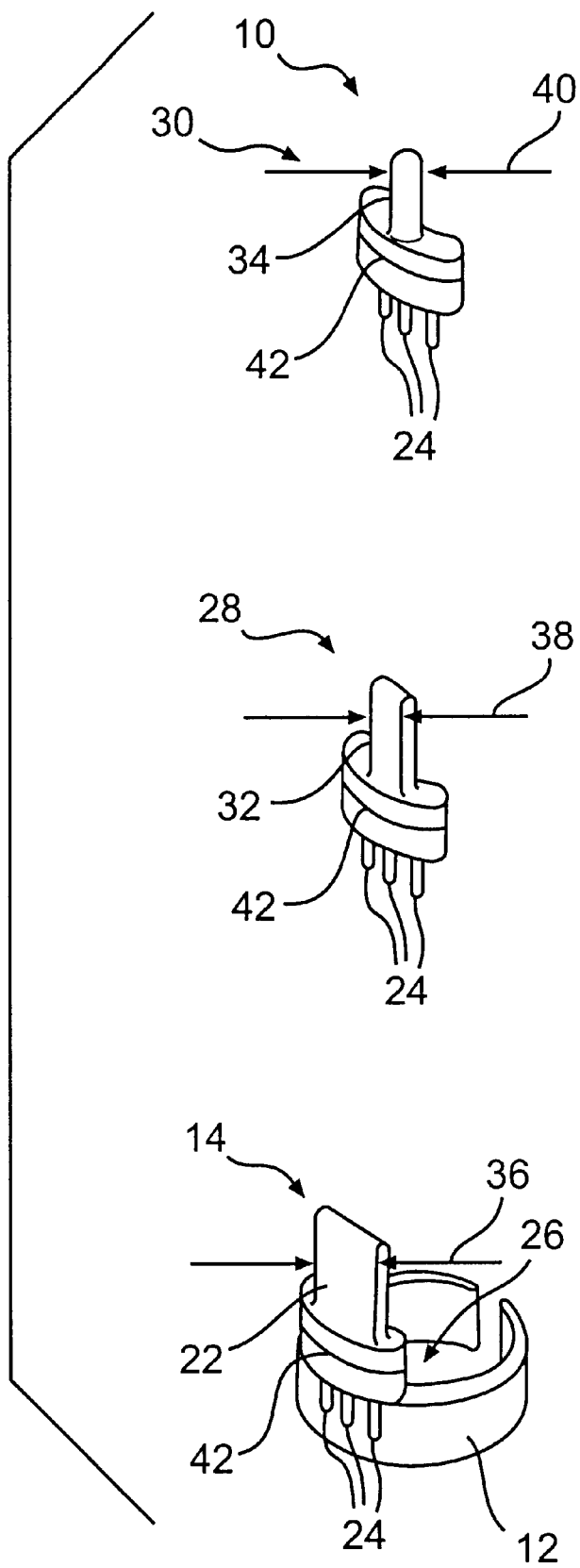
FIG. 3 is a top plan view of the invention, illustrating a plurality of components shown at the left of FIG. 1, wherein each such component differs in dimensions from the others to afford a selection of sizes.

Turning now to FIG. 3, screen operator 10 is seen to include a plurality of tip members 14, 28, 30. Tip members are alike in that each has male connection members 24 matingly compatible with sockets 26 of base 12. Each tip member 14, 28, or 30 has a first diameter 42 proximate male connection members 24. Diameter 42 is identical or nearly so among all tip members 14, 28, or 30, so that tip members 14, 28, and 30 are interchangeable.

However, tip members 14, 28, 30 differ from one another in that dimensions and configurations of their respective projections 22, 32, 34 are not identical. Each tip member 14, 28, or 30 has a diameter 36, 38, or 40 (respectively) differing in magnitude from those of other tip members 14, 28, or 30. This difference in diameter provides different areas of contact with screen 2 (see FIG. 2) corresponding to fine, intermediate, and coarse. All diameters 36, 38, and 40 are less in magnitude than that of diameter 42. This relationship assures that fine, intermediate, and coarse projections 34, 32, 22 are slender relative to diameter 42, so that visibility of screen 2 is not impaired by undue thickness of a projection 22, 32, or 34. Projections 22, 32, and 34 may also vary in length independently of variation in relative diameters, if desired.

It is to be understood that the present invention is not limited to the embodiments described above, but encompasses any and all embodiments within the scope of the following claims.

I claim:

1. A screen operator for effecting operative contact with a touch screen, the screen operator comprising:
   a flexible base comprising:
      a pair of opposed arcuate members sized to resiliently grip a finger, each of the arcuate members terminating in an extreme end, the extreme ends being spaced apart from one another by a gap;
   a tip member, engaged with the base, having a slender rigid projection with a tip end, the tip end being sized as a touch screen stylus tip.

2. The screen operator of claim 1, wherein the tip member is engaged with the base via a frictional engagement.

3. The screen operator of claim 1, wherein the tip member is engaged with the base by being integrally formed therewith.

4. The screen operator of claim 1, wherein each of the pair of opposed arcuate members is shaped to engage a surface of the finger.

5. A finger tip stylus for mounting a finger of a user and for inputting commands and data to a computer via contact with a touch screen, the finger tip stylus comprising:
   a flexible base comprising:
      a pair of opposed arcuate members sized to resiliently grip the finger, each of the arcuate members terminating in an extreme end, the extreme ends being spaced apart from one another by a gap;
   a tip member, engaged with the base, having a slender rigid projection with a tip end, the tip end being sized for efficacious input contact with a touch screen.

6. The finger tip stylus of claim 5, wherein the tip member is engaged with the base via a frictional engagement.

7. The finger tip stylus of claim 5, wherein the tip member is engaged with the base by being integrally formed therewith.

8. The finger tip stylus of claim 5, wherein each of the pair of opposed arcuate members is shaped to engage a surface of the finger.

* * * * *